US012682630B2

(12) United States Patent
Doan et al.

(10) Patent No.: US 12,682,630 B2
(45) Date of Patent: Jul. 14, 2026

(54) MINIMALIST MULTI-MODAL APPROACH TO FEW-SHOT CLASS-INCREMENTAL LEARNING

(71) Applicant: Robert Bosch GmbH, Stuttgart (DE)

(72) Inventors: Thang Doan, San Francisco, CA (US); Sima Behpour, Sunnyvale, CA (US); Xin Li, Sunnyvale, CA (US); Wenbin He, Sunnyvale, CA (US); Liang Gou, San Jose, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 249 days.

(21) Appl. No.: 18/736,815

(22) Filed: Jun. 7, 2024

(65) Prior Publication Data

US 2025/0378682 A1      Dec. 11, 2025

(51) Int. Cl.
*G06V 10/82*          (2022.01)
*G06V 10/74*          (2022.01)

(52) U.S. Cl.
CPC ............ *G06V 10/82* (2022.01); *G06V 10/761* (2022.01)

(58) Field of Classification Search
CPC .............................. G06V 10/82; G06V 10/761
See application file for complete search history.

(56) References Cited

U.S. PATENT DOCUMENTS

2024/0419726 A1* 12/2024 Jenni ..................... G06F 16/535

OTHER PUBLICATIONS

Ding, Yuxuan, et al. "Don't stop learning: Towards continual learning for the clip model." arXiv preprint arXiv:2207.09248 (2022). https://arxiv.org/abs/2207.09248 (Year: 2022).*
Liu, Xialei, et al. "Class incremental learning with pre-trained vision-language models." arXiv preprint arXiv:2310.20348 (2023). https://arxiv.org/abs/2310.20348 (Year: 2023).*
Khattak, Muhammad Uzair, et al. "Self-regulating Prompts: Foundational Model Adaptation without Forgetting." arXiv preprint arXiv:2307.06948 (2023).https://arxiv.org/abs/2307.06948 (Year: 2023).*
D'Alessandro, Marco, et al. "Multimodal Parameter-Efficient Few-Shot Class Incremental Learning." 2023 IEEE/CVF International Conference on Computer Vision Workshops (ICCVW). IEEE, 2023. https://ieeexplore.ieee.org/abstract/document/10350931 (Year: 2023).*

(Continued)

*Primary Examiner* — Han Hoang
(74) *Attorney, Agent, or Firm* — Dickinson Wright PLLC

(57)                ABSTRACT

Methods and systems for Few-Shot Class-Incremental Learning (FSCIL) that utilizes a combination of Session Specific Prompts (SSP) and hyperbolic distance metrics to enhance session-wise learning and representation of image-text pairings across differing classes. The methods and systems include a base training session where both text and image features are projected into hyperbolic space for accurate class pairing using a cross-entropy loss function. Subsequent incremental sessions incorporate previously learned SSPs to retain and augment the separability of classes while minimizing the trainable parameters. This enhances performance in image-text classification tasks by leveraging a minimalistic approach, achieving higher accuracy with fewer trainable parameters compared to traditional models.

20 Claims, 6 Drawing Sheets

(56)          References Cited

OTHER PUBLICATIONS

Yin, Junhui, et al. "In-context prompt learning for test-time vision recognition with frozen vision-language model." arXiv preprint arXiv:2403.06126 (2024).https://arxiv.org/abs/2403.06126v1 (Year: 2024).*

James Kirkpatricka et al., "Overcoming catastrophic forgetting in neural networks." PNAS Mar. 28, 2017, vol. 114, No. 13, pp. 3521-3526.

Kaiyang Zhou et al., "Learning to Prompt for Vision-Language Models." arXiv:2109.01134v6 [cs.CV] Oct. 6, 2022, 13 Pages.

Muhammad Uzair Khattak et al., "Self-regulating Prompts: Foundational Model Adaptation without Forgetting." arXiv:2307. 06948v2 [cs.CV] Aug. 24, 2023, 16 Pages.

Da-Wei Zhou et al., "Learning without Forgetting for Vision-Language Models." arXiv:2305.19270v1 [cs.CV] May 30, 2023, 23 Pages.

Marco D'Alessandro et al., "Multimodal Parameter-Efficient Few-Shot Class Incremental Learning." arXiv:2303.04751v2 [cs.CV] Jan. 8, 2024, 11 Pages.

Maximilian Nickel et al., "Learning Continuous Hierarchies in the Lorentz Model of Hyperbolic Geometry." Proceedings of the 35 th International Conference on Machine Learning, Stockholm, Sweden, PMLR 80, 2018, 10 Pages.

Jonathan Krause et al., "Collecting a Large-Scale Dataset of Fine-Grained Cars." Computer Science, Engineering 2013, 2 Pages.

Subhransu Maji et al., "Fine-Grained Visual Classification of Aircraft." arXiv:1306.5151v1 [cs.CV] Jun. 21, 2013, 6 Pages.

Alec Radford et al., "Learning Transferable Visual Models From Natural Language Supervision." Proceedings of the 38 th International Conference on Machine Learning, PMLR 139, 2021, 16 Pages.

Xiaoyu Tao et al., "Few-Shot Class-Incremental Learning." Proceedings of the IEEE/CVF Conference on Computer Vision and Pattern Recognition 2020, pp. 12183-12192.

Hanbin Zhao et al., "MgSvF: Multi-Grained Slow vs. Fast Framework for Few-Shot Class-Incremental Learning." arXiv:2006. 15524v4 [cs.CV] Mar. 12, 2024, 11 Pages.

Ali Cheraghian et al., "Semantic-aware Knowledge Distillation for Few-Shot Class-Incremental Learning." Proceedings of the IEEE/CVF conference on computer vision and pattern recognition 2021, pp. 2534-2543.

Kai Zhu et al., "Self-Promoted Prototype Refinement for Few-Shot Class-Incremental Learning." Proceedings of the IEEE/CVF con-702 ference on computer vision and pattern recognition 2021, pp. 703 6801-6810.

Da-Wei Zhou et al., "Forward Compatible Few-Shot Class-Incremental Learning." Proceedings of the IEEE/CVF conference on computer vision and pattern recognition 2022, pp. 9046-9056.

Zeyin Song et al., "Learning with Fantasy: Semantic-Aware Virtual Contrastive Constraint for Few-Shot Class-Incremental Learning." Proceedings of the IEEE/CVF Conference on Computer Vision and Pattern Recognition 2023, pp. 24183-24192.

Can Peng et al., "Few-Shot Class-Incremental Learning from an Open-Set Perspective." European Conference on Computer Vision Springer 2022, 16 Pages.

Yibo Yang et al., "Neural Collapse Inspired Feature-Classifier Alignment for Few-Shot Class Incremental Learning." arXiv:2302. 03004v1 [cs.CV] Feb. 6, 2023, 18 Pages.

Da-Wei Zhou et al., "Few-Shot Class-Incremental Learning by Sampling Multi-Phase Tasks." arXiv:2203.17030v2 [cs.CV] Aug. 19, 2022, 17 Pages.

Afra Feyza Akyurek et al. "Subspace Regularizers for Few-Shot Class Incremental Learning." arXiv:2110.07059v2 [ cs.CV] Feb. 20, 2022, 18 Pages.

Yuxuan Ding et al., "Don't Stop Learning: Towards Continual Learning for the CLIP Model." arXiv:2207.09248v2 [cs.CV] Jul. 20, 2022, 12 Pages.

Runqi Wang et al., "AttriCLIP: A Non-Incremental Learner for Incremental Knowledge Learning." Proceedings of the IEEE/CVF Conference on Computer Vision and Pattern Recognition 2023, pp. 3654-3663.

In-Ug Yoon et al., "Image-Object-Specific Prompt Learning for Few-Shot Class-Incremental Learning." arXiv:2309.02833v2 [cs. CV] Dec. 7, 2023, 13 Pages.

Marc T. Law et al., "Lorentzian Distance Learning for Hyperbolic Representations." Proceedings of the 36 th International Conference on Machine Learning, Long Beach, California, PMLR 97, 2019, 10 Pages.

Valentin Khrulkov et al., "Hyperbolic Image Embeddings." The IEEE/CVF Conference on ComputerVision and Pattern Recognition (CVPR), 2020, pp. 6418-6428.

Ramit Sawhney et al., "DMIX: Adaptive Distance-aware Interpolative Mixup." Proceedings of the 60th Annual Meeting of the Association for Computational Linguistics (vol. 2: Short Papers), Dublin, Ireland, 2022. Association for Computational Linguistics. 2, 7 Pages.

Christopher Lang et al., "On Hyperbolic Embeddings in Object Detection." Pattern Recognition: 44th DAGM German Conference, DAGM GCPR 2022, Konstanz, Germany, Sep. 27-30, 2022, Proceedings, 19 Pages.

Thang Doan et al., "Hyp-OW: Exploiting Hierarchical Structure Learning with Hyperbolic Distance Enhances Open World Object Detection." arXiv:2306.14291v4 [cs.CV] Feb. 15, 2024, 25 Pages.

Karan Desai et al., "Hyperbolic Image-Text Representations." Proceedings of the 40th International Conference on Machine Learning, PMLR 202, 2023, 38 Pages.

* cited by examiner

Figure 2:
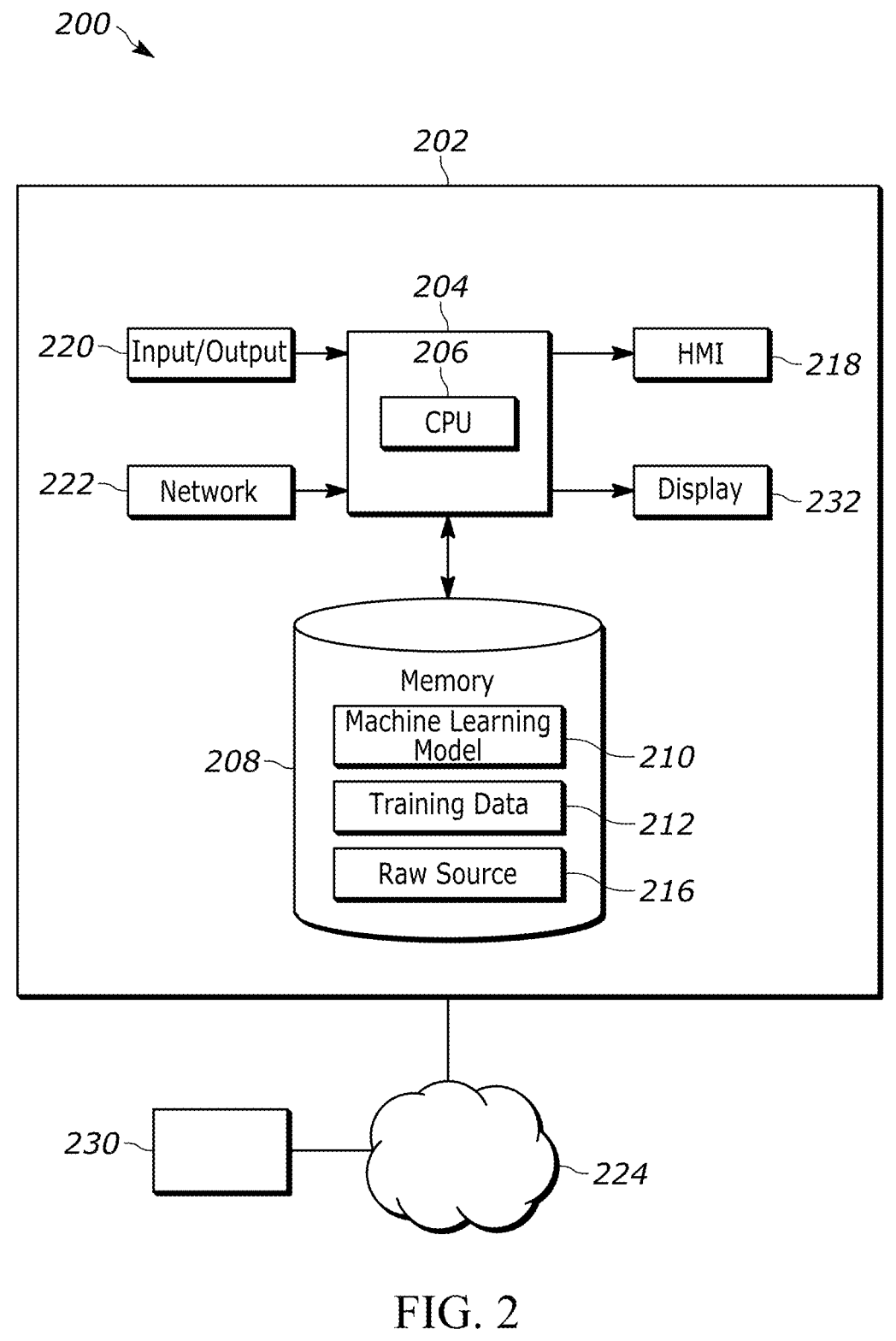

*200*

*202*

*204*

*220* Input/Output

*206*

CPU

HMI *218*

*222* Network

Display *232*

Memory

Machine Learning Model *210*

*208*

Training Data *212*

Raw Source *216*

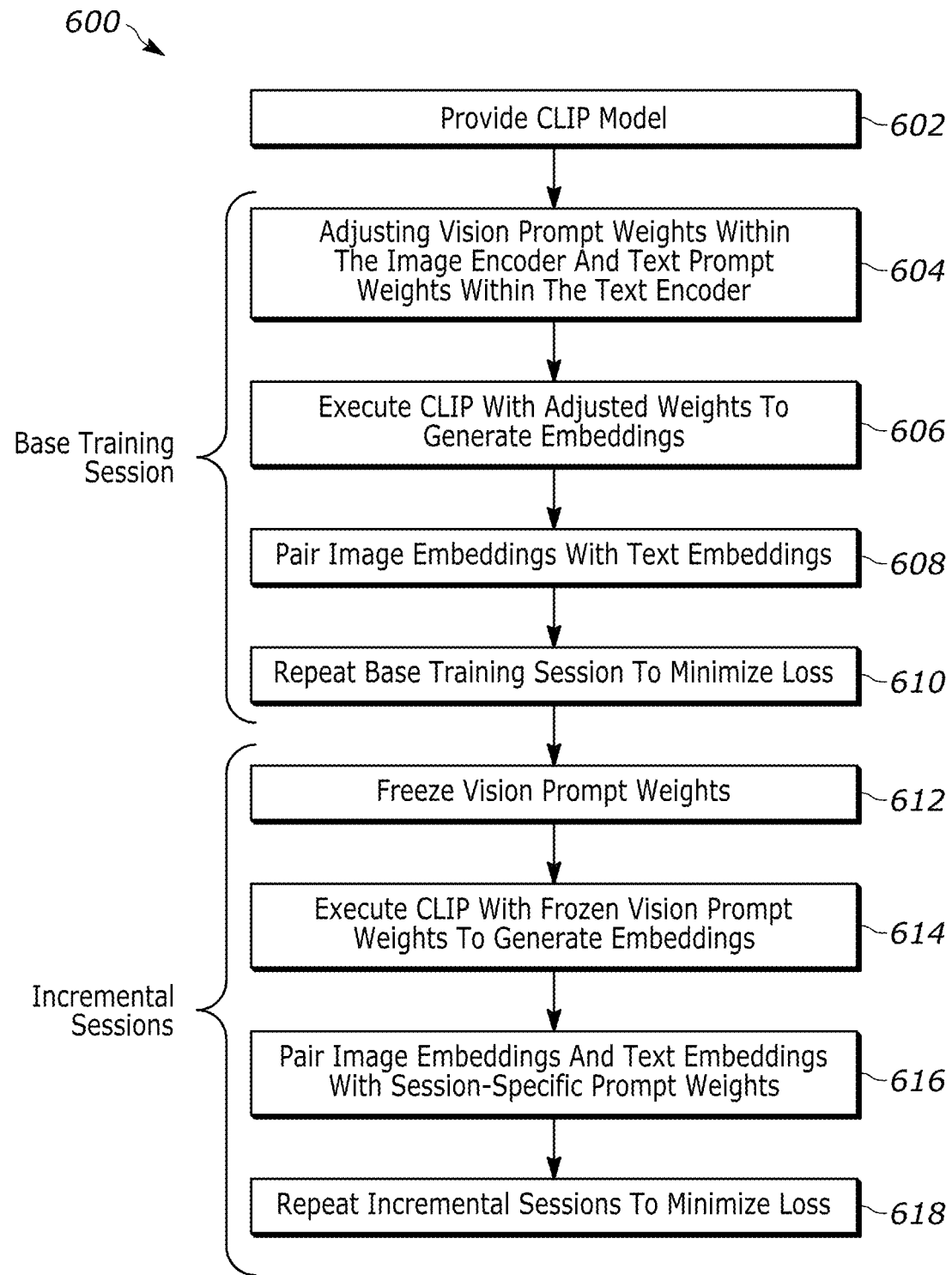

Provide CLIP Model — 602

Base Training Session

Adjusting Vision Prompt Weights Within The Image Encoder And Text Prompt Weights Within The Text Encoder — 604

Execute CLIP With Adjusted Weights To Generate Embeddings — 606

Pair Image Embeddings With Text Embeddings — 608

Repeat Base Training Session To Minimize Loss — 610

Incremental Sessions

Freeze Vision Prompt Weights — 612

Execute CLIP With Frozen Vision Prompt Weights To Generate Embeddings — 614

Pair Image Embeddings And Text Embeddings With Session-Specific Prompt Weights — 616

Repeat Incremental Sessions To Minimize Loss — 618

FIG. 6

MINIMALIST MULTI-MODAL APPROACH TO FEW-SHOT CLASS-INCREMENTAL LEARNING

TECHNICAL FIELD

The present disclosure pertains to the field of machine learning, specifically to techniques for Few-Shot Class-Incremental Learning (FSCIL).

BACKGROUND

Few-Shot Class-Incremental Learning (FSCIL) is a subfield of machine learning that addresses challenges related to knowledge retention, learning from minimal data, and preventing model overfitting. Few-shot learning refers to a machine learning paradigm where a model is trained to recognize or classify new classes with only a small number of examples per class. Traditional machine learning approaches often require large amounts of labeled data for each class, but in few-shot learning, the model is trained to generalize from a few examples. In class-incremental learning, the model learns to incrementally recognize new classes over time, without forgetting previously learned classes. This can be important in scenarios where the model needs to continuously adapt to new classes without retraining from scratch. Combining these two concepts, few-shot class-incremental learning (FSCIL) involves training a model to recognize new classes with only a few examples per class while also ensuring that the model can adapt to new classes over time without forgetting previously learned classes.

SUMMARY

In an embodiment, a computer-implemented method for training a machine-learning system with few-shot class-incremental learning includes the following steps: providing a Contrastive Language-Image Pretraining (CLIP) model having (i) an image encoder configured to generate image embeddings associated with input images, (ii) a text encoder configured to generate text embeddings associated with text input, and (iii) a comparison module configured to compare similarities amongst the image embeddings and the text embeddings; during a base training session: (i) adjusting vision prompt weights within the image encoder and text prompt weights within the text encoder, (ii) executing the CLIP model on the input images and the text input with the adjusted vision prompt weights and text prompt weights to generate base session image embeddings and base session text embeddings, (iii) pairing the base session image embeddings and the base session text embeddings using a base session cross-entropy loss function, and (iv) repeating the base training session to minimize the base session cross-entropy loss function; during incremental sessions after the base training session: (i) freezing the vision prompt weights while leaving the text prompt weights unfrozen, (ii) executing the CLIP model with the frozen vision prompt weights and the unfrozen text prompt weights to generate incremental session image embeddings and incremental session text embeddings, (iii) pairing the incremental session image embeddings and the incremental session text embeddings using an incremental session cross-entropy loss function with session-specific prompt weights associated with each respective incremental session, and (iv) repeating the incremental sessions to minimize the incremental session cross-entropy loss function utilizing the session-specific prompt weights; and outputting a trained machine-learning system based on the base training session and the incremental sessions.

Systems having processors and memory containing instructions that, when executed by at least one of the processors cause the at least one processor to perform the steps recited above.

In other embodiments, non-transitory computer readable media can be provided with instructions that, when executed, cause the above steps to be performed.

BRIEF DESCRIPTION OF THE DRAWINGS

FIG. 2 shows a computer-implemented method for training and utilizing a neural network, according to an embodiment.

FIG. 6 shows a block diagram of a computer-implemented method for training a machine-learning system with few-shot class-incremental learning, according to an embodiment.

DETAILED DESCRIPTION

Figure 1:
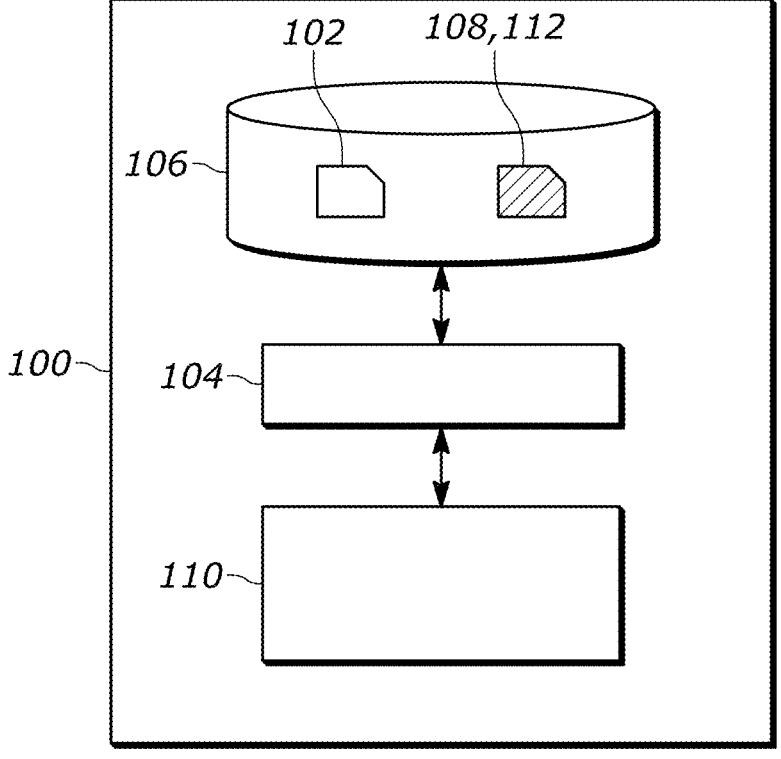
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In the current landscape of Few-Shot Class-Incremental Learning (FSCIL), machine learning models struggle to efficiently handle the integration and retention of newly acquired knowledge across multiple training sessions with limited data. State-of-the-art techniques predominantly rely upon extensive parameter tuning of pre-trained models which, while effective in broader classification tasks, fall short in environments with sparse data. This results in substantial computational overhead and the risk of catastrophic forgetting, where the incorporation of new classes can dilute previously learned information. Additionally, traditional models do not effectively leverage the complex hierarchical structures inherent in image-text pair learning scenarios, thus limiting their potential in applications demanding nuanced understanding and differentiation across evolving classes.

Embodiments of the invention disclosed herein address these challenges by integrating a dual-component system that employs Session Specific Prompts (SSP) and hyperbolic distance metrics. This approach significantly enhances session-wise learning and representation of image and text pairings, while effectively managing the hierarchical complexity of class relationships in an incrementally learning context. In embodiments, the system projects both image and text embeddings into hyperbolic space, leveraging its expansive geometrical properties to improve class separability and reduce the overlap between class features. This method not only achieves higher accuracy and efficiency in handling incoming classes but also drastically reduces the number of trainable parameters, easing computational demand and mitigating the risk of overfitting commonly associated with FSCIL tasks. The incorporation and optimization of SSP in subsequent sessions further ensure the retention of learned knowledge, making this invention highly advantageous for applications in dynamic learning environments.

Machine learning and neural networks are an integral part of the inventions disclosed herein. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106.

The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation and a part of the input of the stack of layers. The processor subsystem 110 may be further configured to iteratively train the neural network using the training data 102. Here, an iteration or session of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network; this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may, during or after the training, be replaced at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The system 100 shown in FIG. 1 is one example of a system that may be utilized to train the machine learning models described herein.

FIG. 2 depicts a system 200 to implement and/or execute the machine-learning models described herein, for example the contrastive learning models and/or the Minimalist Multi-Modal approach to Contrastive Language Image Pretraining (CLIP) models, dubbed CLIP-M$^3$. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuity or BUS networks to transfer information to or between the processor(s) and storage. For example, the I/O interface 220 can include digital I/O logic lines which can be read or set by the processor(s), handshake lines to supervise data transfer via the I/O lines, timing and counting facilities, and other structure known to provide such functions. Examples of input devices include a keyboard, mouse, sensors, touch screen, etc. Examples of output devices include monitors, touchscreens, speakers, head-up displays, vehicle control systems, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input. The computing system 202 may include a display device 232. The computing system 202 may include hardware and software for outputting graphics and text information to the display device 232. The display device 232 may include an electronic display screen, projector, speaker or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate one or more of the machine learning models described herein, including the CLIP and CLIP-$M^3$ models.

The computing system 202 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified. The training dataset 212 may also include the text description of the scene that corresponds to the images detected by the vehicle sensors (e.g., "a 25 mph speed limit sign").

The machine-learning algorithm 210 may be operated in a learning mode using the training dataset 212 as input. The machine-learning algorithm 210 may be executed over a number of iterations or sessions using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of agents in video images, annotate the occurrences, and/or command the vehicle to take a specific action (planning) based on the locational data of the agent (perception) and the predicted future movement/location of the agent (prediction). The machine-learning algorithm 210 may be programmed to process the raw source data 216 to identify the presence of the particular features. The machine-learning algorithm 210 may be configured to identify a feature in the raw source data 216 as a predetermined feature (e.g., road sign, pedestrian, etc.). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera. The raw source data 216 can be natural language text information associated with a scene (e.g., "a car is entering the intersection from the left").

The present disclosure introduces Minimalist Multi-Modal approach to Contrastive Language-Image Pretraining (CLIP). This approach has been dubbed CLIP-M³. However, it should be understood that other contrastive learning models can be employed instead of CLIP. As an example, an introduction to the CLIP model is provided with reference to FIG. 3, and then further description of CLIP-M³ is provided with reference to the remaining Figures.

CLIP was developed by OpenAI. It is designed to understand and connect images and natural language descriptions in a way that allows it to perform a wide range of vision and language tasks. CLIP employs a dual-encoder architecture, comprising a vision encoder and a text encoder, and a shared embedding space. The vision encoder processes images, while the text encoder processes natural language descriptions. The vision encoder, based on a vision model like a convolutional neural network (CNN), converts images into a fixed-length vector representation. The text encoder processes textual descriptions by converting them into a fixed-length vector representation. CLIP is a vision-language foundation model trained on open world data using contrastive learning. Contrastive learning is a type of machine learning where the model learns to distinguish between positive and negative pairs of data. In the context of CLIP, the "positive pair" consists of an image and a text description that are semantically related, while the "negative pair" consists of an image and a randomly selected text description that is not related. During training, CLIP is designed to encourage bringing together features from related text and images pairs into a common embedding space, while pushing unrelated pairs apart.

CLIP's shared embedding space allows for zero-shot learning. When presented with an image and a text prompt, CLIP can rank how well the image matches the prompt without specific training data for that particular task. CLIP can perform various vision-language tasks, including image classification, text-based image retrieval (e.g., retrieving images based on textual queries), image captioning, zero-shot object recognition, and others.

Figure 3:
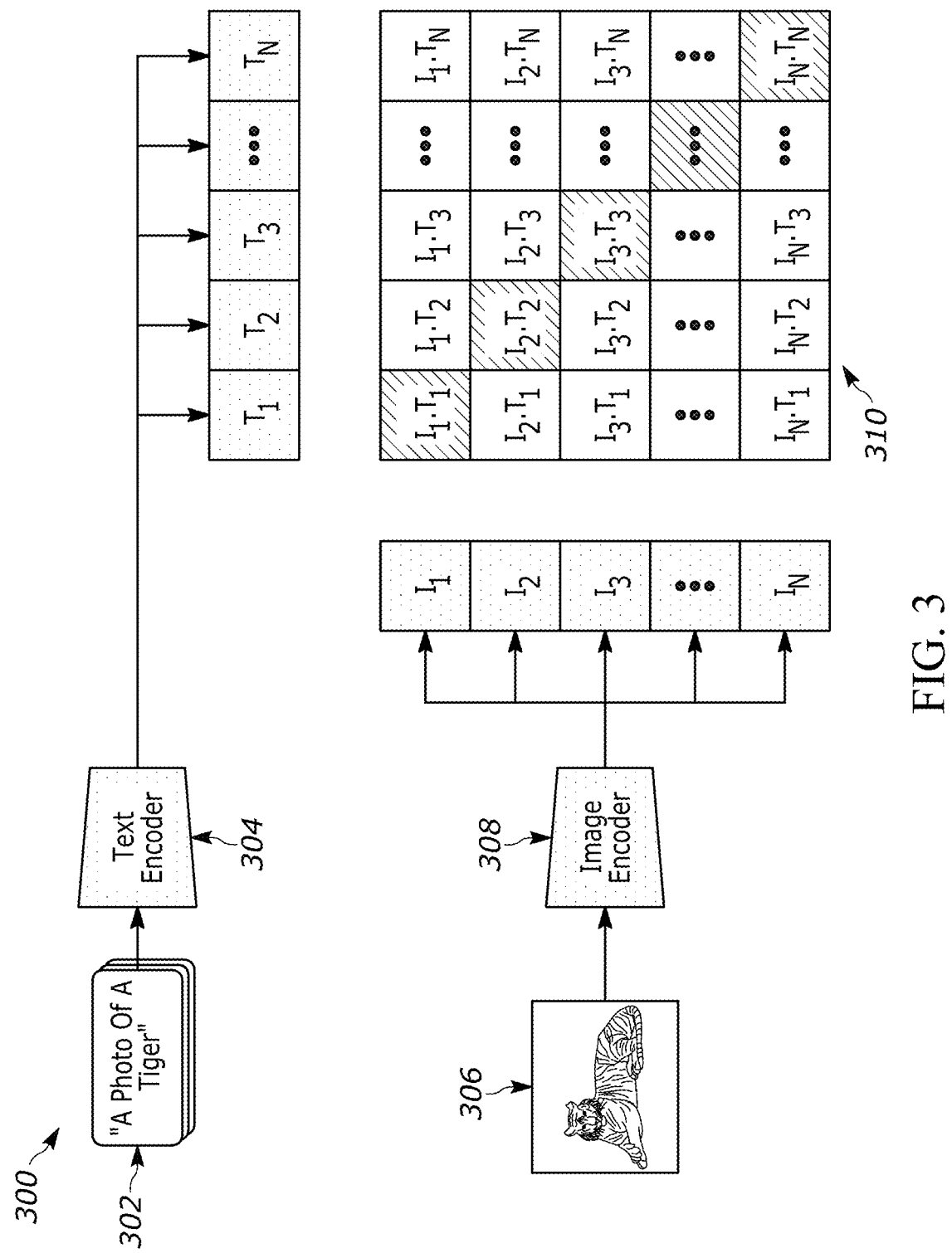
FIGS. 3-5 show schematics of contrastive learning models, according to embodiments.

The contrastive learning concept used in CLIP is illustrated in FIG. 3, generally shown as a contrastive learning model at 300. As shown, a plurality of natural language text descriptions 302 are fed into a text encoder 304, and a plurality of images 306 are fed into an image encoder 308. The model 300 then performs feature mapping, where the vectors output by the encoders are mapped to a joint embedding space. For example, an image vector output by the image encoder (e.g., of a size 1×256) is matched to a corresponding text vector output by the text encoder (e.g., of a size 1×256). The model then performs a dot product between a batch of image and text features to get the similarity between these vectors, shown generally at 310.

Referring to the example embodied in FIG. 3, a plurality of images 306 (one of which being an image of a tiger in this example) are fed into image encoder 308, and a plurality of text phrases 302 (one of which being something like "a photo of a tiger" in this example) is fed into text encoder 304. Several irrelevant or dissimilar text phrases and images are also fed into the encoders. For example, images of objects that are not tigers are fed into the image encoder 308, and phrases that have nothing to do with tigers are also fed into the text encoder 304. The image encoder produces an image vector having features $I_1, I_2, \ldots I_N$ while the text encoder produces a text vector having features $T_1, T_2, \ldots T_N$. The diagonal of the resulting matrix 310 from this dot product shows paired image and text according to their likely similarity, while the off-diagonal represent unpaired image and text features (e.g., an image of a cat and a text description like "a picture of a dog").

As such, the contrastive learning model brings the image and text embeddings closer together when they correspond to each other, and pushes them apart when they do not. In other words, referring to FIG. 3, during training, the contrastive learning model aims to increase the similarity of diagonal elements (i.e. positive pairs), while decreasing the similarity between off-diagonal elements. As another example, during training, if the model is provided with an image of a cat and a text description like "a picture of a cat", the model aims to minimize the distance (similarity) between the image and text embeddings in the shared space; conversely, if the model is provided with an image of a cat and a text description like "a picture of a dog," the model aims to maximize the distance (dissimilarity) between their embeddings. This contrastive training objective encourages the model to learn to understand the semantic relationships between images and text. It is a way to teach the model to associate matching image-text pairs closely and distinguish non-matching pairs effectively. The result is a shared embedding space where similar pairs cluster together, and dissimilar pairs are far apart.

Figure 4:
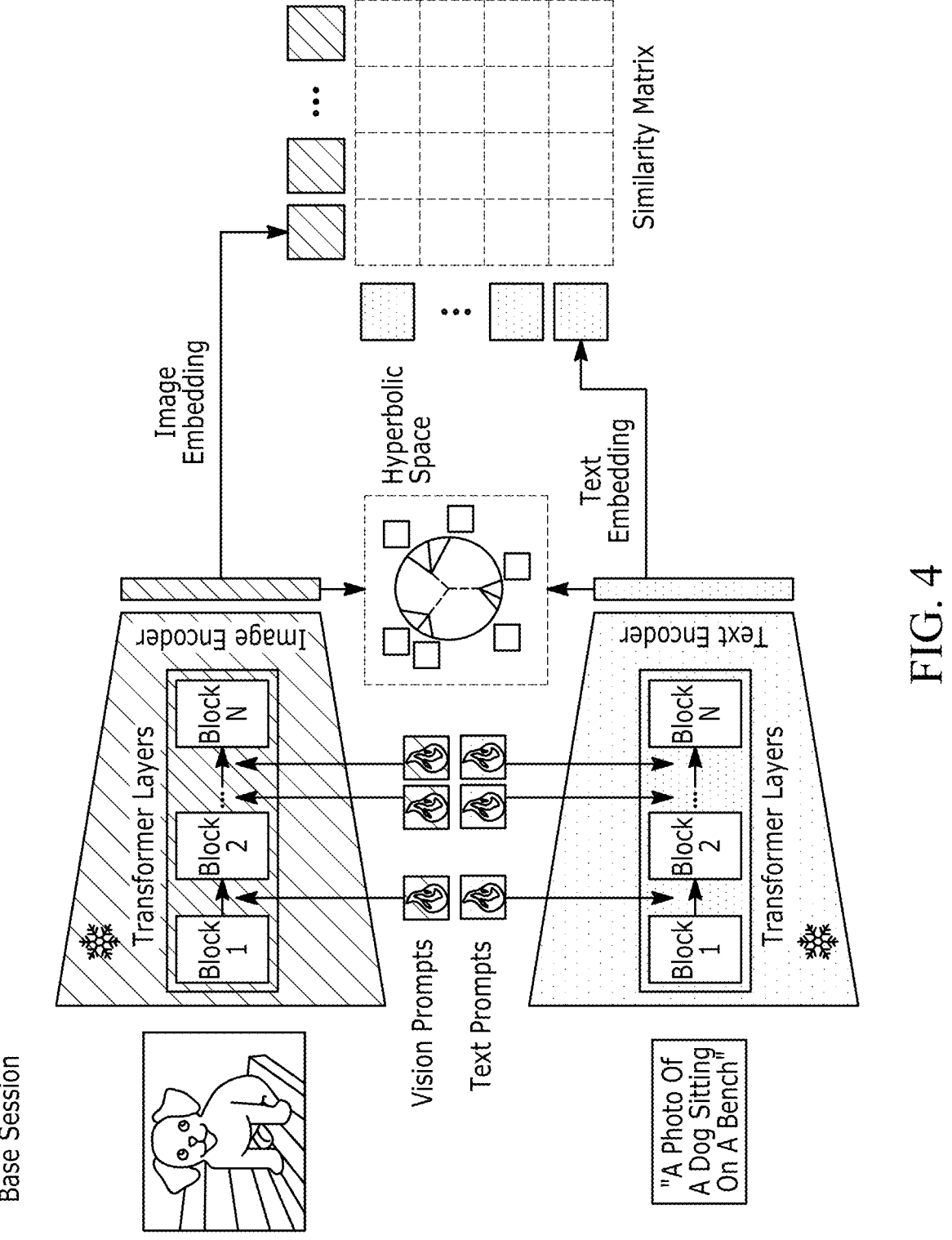
Figure 5:
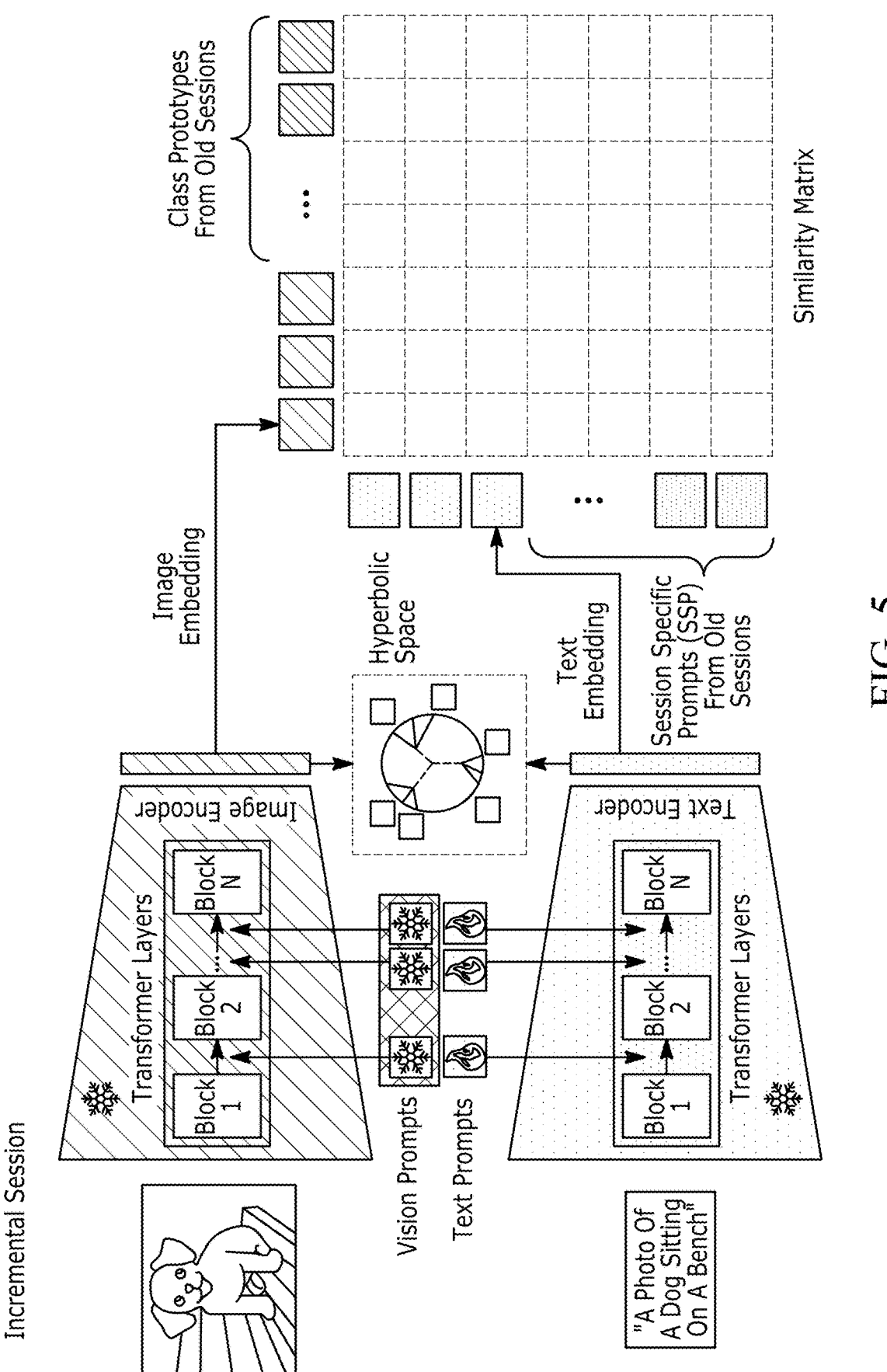

FIGS. 4-5 illustrate schematic representations of a Minimalist Multi-Modal approach to CLIP (CLIP-M³), wherein FIG. 4 provides a schematic representation of a base session in a learning system that involves processing vision and text prompts, and FIG. 5 provides a schematic representation of an incremental session in a FSCIL environment, according to an embodiment.

Referring to FIG. 4, vision prompts (e.g., images) depicting a dog sitting on a bench are shown. These images can derive from an image sensor (e.g., camera) of a real-world environment, or can be images from a training database. These images serve as inputs that are processed through an image encoder comprising multiple transformer layers. The result of this encoding is an image embedding. Concurrently, text prompts (e.g., phrases) such as "A photo of a dog sitting on a bench" are processed through a text encoder, also consisting of multiple transformer layers, to generate text embeddings. The transformers for both image and text are depicted, indicating a sequential process through several stages (Block 1, Block 2, Block 3, etc.). The text prompts can be generated through a predefined or dynamically created textual description of the associated images. These descriptions are crafted to reflect the content and context of the corresponding images, providing a textual perspective that complements the visual input. This dual-input approach, where both image and text prompts are derived from coordinated real-world data, enables the system to effectively train on and analyze image-text pairings, enhancing its ability to perform Few-Shot Class-Incremental Learning (FSCIL) tasks with high accuracy and efficiency.

In embodiments, the blocks or layers within the image encoder include tokenization, wherein the input text is tokenized into individual words or subwords, for example using techniques like Byte Pair Encoding (BPE) or Word-Piece. The blocks within the image encoder can also include embedding lookup functions, wherein each token is mapped to a high-dimensional vector representation (embedding) using a pre-trained embedding matrix. The blocks within the image encoder can also include positional encoding functions, wherein positional encodings are added to the token embeddings to provide information about token positions. The blocks within the image encoder can also include transformer blocks having self-attention mechanisms and feedforward neural networks. These transformer blocks enable the model to capture complex patterns and dependencies within the text data. The transformer layers within the image encoder serve to process the images through these operations to enhance the model's understanding and representation of the data. In embodiments, the transformer layers within the image encoder analyze visual inputs by breaking down the images into patches or segments, treating each as a discrete input similar to how words are treated in text. The self-attention mechanism allows the model to weigh and prioritize different parts of an image relative to others, facilitating a more detailed and context-aware interpretation. For instance, in an image of a dog sitting on a bench, the transformer layers can differentiate and emphasize the features of the dog in relation to the less significant background features like the bench or surrounding scenery. This process enhances the model's ability to focus on salient features relevant to the training tasks.

Similarly, in the text encoder, transformer layers process textual data by considering each word or token as part of a sequence. The self-attention mechanism here enables the model to understand the context provided by surrounding words, thereby capturing nuances in language such as syntax and semantics. For example, the phrase "A photo of a dog sitting on a bench" is processed with each word influencing the contextual understanding of the others, helping the encoder grasp the overall meaning and relevance of the text more effectively. Through these transformer layers, both the image and text encoders are able to convert raw data into high-dimensional embeddings. These embeddings represent the inputs in a form that is suitable for further processing, such as projection into hyperbolic space for similarity analysis and class pairing discussed further herein.

During the base session, vision prompts can be injected into the image encoder, which otherwise has frozen weight variables. These vision prompts are learnable weights that can be adjusted, and therefore can be referred to as vision prompt weights. The vision prompt weights can comprise processed visual data (e.g., vectorized) that is fed into the transformer layers, such as interspliced between and amongst the transformer layers. A role of these vision prompt weights is to encapsulate visual features essential for class identification and differentiation, which are crucial for effective incremental learning. By executing the base session, these learnable vision prompts are trained with an eye at reducing the overall system loss.

Similarly, text prompts can be injected into the text encoder, which otherwise has frozen weight variables. These text prompts are also learnable weights that can be adjusted, and therefore can be referred to as text prompt weights. The text prompt weights can also be vectorized data used to modify the operation and execution of the image encoder, and can enhance the model's understanding by providing additional contextual clues that help in the more accurate pairing of text and image embeddings.

In embodiments, the interleaving of vision and text prompt weights within transformer layers is employed to enhance the embedding process. In embodiments, both types of prompts are alternately introduced into the transformer layers during the training phase. This method allows each type of prompt to influence the learning context of the other, fostering a richer and more interconnected representation of data. In other embodiments, the prompts are introduced at other, non-alternating fashion.

During the interleaving process, vision prompts are first passed through designated transformer layers optimized for visual data processing. These layers analyze and encode the visual information into embeddings. Following this, text prompts are processed through either the same or a different set of transformer layers optimized for textual data processing. The text embeddings are then generated.

The alternative arrangement ensures that the insights gained from the text can modulate the interpretation of the visual data and vice versa. This cross-modal learning helps build robust models capable of understanding the nuanced interplay between different types of data inputs.

Ultimately, during the base session, the image encoder is executed with the image prompts injected (e.g., interleaved) therein to generate image embeddings. Likewise, the text encoder is executed with the text prompts injected therein to generate text embeddings.

FIG. 4 also illustrates a hyperbolic space encoder or module, functioning to project both image and text embeddings into a hyperbolic space. This projection aids to manipulate the embeddings for subsequent similarity analysis.

The process of projecting image and text embeddings into hyperbolic space involves transforming the Euclidean embeddings into a hyperbolic geometry to capitalize on the intrinsic hierarchical structure of data. This projection utilizes an exponential mapping function defined as $$\exp_0^c(x) = \tanh\left(\sqrt{c}\,\frac{\|x\|}{2}\right)\frac{x}{\sqrt{c}\,\|x\|}$$

where c is a curvature parameter of the hyperbolic space. Here, the function defines a scaled vector based on the input vector x. It uses the hyperbolic tangent function, tanh, which helps to scale the magnitude of the vector x, keeping its direction unchanged, but adjusting its length towards a specific limit as defined by the parameter c. This scaling is both dependent on and proportional to the original length of the vector x. The transformation leverages the unique properties of hyperbolic space, notably its capacity to model data with inherent hierarchical relationships effectively and its exponential growth of volume with respect to radius, which aligns well with certain types of class-structured data encountered in machine learning tasks.

For every embedding query q, its projection z can be denoted into the hyperbolic space as:

$$z = \exp_0^c(q)$$

In embodiments, this projection begins with the system calculating the norm of the vector x in the Euclidean space, followed by scaling it according to the curvature c of the hyperbolic space. The scaling involves the hyperbolic tangent function, which ensures that the resulting vector lies within the Poincaré ball model of hyperbolic space, a bounded model where the points of the hyperbolic space are represented inside a unit ball in Euclidean space. The resultant scaled vector is then normalized by its norm, adhering it to the geometric constraints of hyperbolic space. This process effectively encodes the magnitude of the original vector while preserving the direction, thereby maintaining the relative positioning of data points post-projection.

This hyperbolic embedding technique can be advantageous in the context of FSCIL, where the complexity and diversity of class increments can benefit from the dimensional expansiveness and hierarchical ordering facilitated by hyperbolic spaces. The embeddings in this space allow for more nuanced separations and associations among classes that evolve over sequential learning sessions, enhancing the system's ability to differentiate between new and existing classes while leveraging the depth of hierarchical relationships inherent in the data structure.

In the context of FSCIL, there are a few notations that should be described. For example, in FSCIL, the learner is tasked with assimilating knowledge from a sequential stream of data, represented as $D_{\{train\}}=\{D_t\}$, t=0 . . . T. Each training session, denoted ($C_t$) encompasses a set $\{D_t\}=\{(x_t, y_t)\}$, t=0 . . . T, wherein $x_t$ and $y_t$ symbolize the image and corresponding label, respectively. It is noteworthy that the class categories in distinct sessions are non-overlapping, which implies that $C^t \cap C^i=\emptyset$, for t≠i.

At the end of each training session, the learner's performance is evaluated based on all the classes learned up to that point, formalized as $C^{k \leq t}=U_k C^k$, k=0 . . . t. The initial training session, referred to as the base session and designated as session 0, features a broader set of samples compared to the more focused subsequent incremental sessions, which typically adopt an n-way-k-shot format, encompassing k samples for each of n classes.

The learnable weights associated with text and image prompts, integral to the encoding process through transformer layers related to text and vision encoders, are denoted as $P_V$ and $P_T$ for vision and text, respectively. Furthermore, we can let $z^y$ and $h^y$ denote the image and text features, respectively, whether these are projected into hyperbolic space or not. The terms 'image features' and 'vision prompts' are used interchangeably as dictated by the specific context to prevent any ambiguity in reference.

Referring back to FIG. 3, following the projection into hyperbolic space, a pairing module utilizing a similarity matrix compares text and image embeddings. The similarity matrix visually represents the relationships between different image-text pairs, aiding in determining their closeness or dissimilarity in the hyperbolic space. This component enables assessing and enhancing the efficiency and accuracy of the learning model detailed in FIG. 3. The pairing mechanism is applied using a cross-entropy loss function. This function facilitates the accurate association of visual and textual features with their respective classes. The probability of a visual prompt feature $z_y$ belonging to a specific class y is computed as follows:

$$p(y \mid z^y) = \frac{\exp \dfrac{sim(z^y, h^y)}{\tau}}{\sum_{\hat{y} \in C^0} \exp \dfrac{sim(z^y, h^{\hat{y}})}{\tau}}$$

Here, sim( . . . ) denotes a similarity function, which could either be based on cosine similarity or the hyperbolic distance between embeddings, and τ is a temperature parameter that scales the output of the similarity function.

The hyperbolic distance, designated as $d_{hyp}(x, y)$ between two points x and y in hyperbolic space, is determined as designated as follows:

$$d_{hyp}(x, y) = \frac{2}{\sqrt{c}} \operatorname{arctanh}\left(\sqrt{c} \| -x \oplus_c y \|\right)$$

$$x \oplus_c y = \frac{\left(1 + 2c\langle x, y \rangle + c\|y\|^2\right)x + \left(1 - c\|x\|^2\right)y}{\left(1 + 2c\langle x, y \rangle + c^2\|x\|^2\|y\|^2\right)}$$

The cross-entropy loss function for the base session is then defined as:

$$L_{CE}^{T=0} = \mathbb{E}_{(z,y) \sim D_0}\left[-\log p(y \mid z)\right]$$

Hyperbolic distance enhances the separability between different classes' representations by leveraging the natural geometric properties of hyperbolic space. Unlike Euclidean geometry, hyperbolic space expands exponentially, which makes it particularly suitable for data with inherent hierarchical structures or when a large number of distinctions between classes is required. This attribute allows for a more nuanced and expansive embedding space, facilitating better class separation and, consequently, an improved classification accuracy in tasks like FSCIL.

By employing hyperbolic distance within the cross-entropy loss function, the system can more effectively minimize the proximity between similar class embeddings while maximizing the distance between dissimilar ones. This method underscores the enhancement of the system's ability to maintain distinctions between classes across learning sessions, crucial for the incremental learning process where new classes are continuously introduced. Additionally, this optimization strategy aids in preventing overfitting by not relying solely on the magnitude of feature vectors but also on their relative positions within the hyperbolic space, fostering a robust and adaptable learning environment.

In embodiments, the system can include regulatory strategy aimed at preserving the pre-learned knowledge embedded within the frozen features $f_p$ and $g_p$ of both visual and textual representations. This is achieved through regularization terms added to the loss function, specifically:

$$L_{image-reg} = \sum_{i=0}^{d} |f_p - f|$$

and $$L_{text-reg} = \sum_{i=0}^{d} |g_p - g|$$

where f and g are the features being learned, and $f_p$ and $g_p$ denote the frozen, pre-learned features. This regularization ensures that deviations from the pretrained embeddings are minimized, thus conserving the foundational structural knowledge.

With this, the total loss for the base session $L_{base}$ is then formulated as:

$$L_{base} = L_{CE}^{T=0} + \alpha L_{image-reg} + \beta L_{text-reg}$$

Where $\alpha$ and $\beta$ are coefficients that balance the main task's objective function with the regularization terms, optimizing both the learning of new data and the retention of existing knowledge.

This base session training approach thus establishes a framework where both new and pre-existing knowledge are effectively integrated, setting a robust foundation for subsequent incremental learning sessions.

Once the base session learning is completed, the user encounters incremental sessions, each containing k samples from n classes ($n \ll |C^0|$). FIG. 5 shows a schematic representation of a system configured to perform an incremental session in a FSCIL environment, according to an embodiment. The system includes several features that are similar to those described with reference to the base session training of FIG. 4, while introducing the integration of Session Specific Prompts (SSPs) from old sessions and class prototypes from old sessions in the similarity matrix configurations to enhance the retention of learned classes and manage new information. The objective here is to learn them without risking the loss of base session's knowledge. To achieve this, we freeze the visual prompts weights $P_V$, leaving only the text features parameters $P_T$ to be trainable. By freezing the vision prompts weights, the system effectively prevents the modification or relearning of the visual embeddings that have previously been established, thus mitigating the risk of catastrophic forgetting—a challenge in incremental learning scenarios. This approach allows the system to maintain a consistent and robust foundation of visual knowledge across different learning sessions. The frozen visual prompts serve as a reference point, ensuring that the incremental training sessions focus primarily on integrating and adapting new textual data without the disruption of established visual representations. Consequently, this method not only aids in enhancing the efficiency of the learning process by reducing the parameters that need active training but also improves the system's overall ability to generalize across varied visual inputs without diluting previously acquired knowledge.

In practical terms, by freezing the vision prompts, the system directs its computational resources and learning capacity toward the dynamic aspects of the session-specific prompts and the text embeddings. This strategic allocation allows for a more focused training effort on textual modifications and adaptations, which are pivotal in handling new class information and instructions in incremental sessions. Thus, the integrity and relevance of the visual information are preserved, providing a stable backdrop against which textual nuances can be more effectively learned and integrated into the FSCIL framework.

As illustrated in FIG. 5, the similarity matrix includes the introduction of Session Specific Prompts (SSP) from old sessions, and class prototypes derived from prior sessions. This interaction plays a supportive role in maintaining the integrity of previously learned classes while simultaneously integrating new information, mitigating the risk of catastrophic forgetting. The class prototypes facilitate the measurement of similarity and class membership across different sessions. The SSP from old sessions interact with the matrix to enhance the efficiency of the similarity evaluations. In other words, each SSP and class prototype is reintegrated into the current session's training process to serve as a benchmark, ensuring that new sessions' prompts are not only distinguishable but also consistent with previously established patterns. By incorporating prompts that were effective in past learning scenarios, the system leverages proven strategies to handle new data. This enables the preservation of continuity and coherence across learning sessions, ensuring that the integration of new information does not erase or overly distort the learned models from previous sessions.

The class prototypes from previous sessions include predefined groupings of data points or variables that typify specific characteristics or behaviors of past data classifications. By embedding these prototypes into the Similarity Matrix's computations, the system can reference historical class information, reducing the redundancy of re-learning from the foundational knowledge. This framework utilizes the prototypes to quickly anchor new data points to the already established class structures.

Overall, the integration of class prototypes and effective SSP into the Similarity Matrix not only conserves valuable computational resources but also significantly smoothens the transition from old to new learning phases, supporting both retention and adaptive learning.

To accomplish this, in embodiments, a non-differentiable copy of session specific text prompts, denoted as $\widetilde{h}^y$, where y is an element of the class set $C^{k<t}$, is saved. These saved prompts are subsequently incorporated into the probability function for incremental learning sessions. This incorporation utilizes $\widetilde{h}^y$ to adjust the probability function, defined as:

$$p(y \mid z^y) = \frac{\exp \dfrac{sim(z^y, h^y)}{\tau}}{\sum_{\tilde{y} \in C^{k<t}} \exp \dfrac{sim(z^y, \tilde{h}^y)}{\tau} + \sum_{\tilde{y} \in C^t} \exp \dfrac{sim(z^y, h^{\tilde{y}})}{\tau}}$$

where sim denotes an similarity metric employing a temperature parameter $\tau$. This methodology aids in maintaining and reinforcing the memory of learned classes from previous sessions, thereby ensuring better accuracy and consistency as new data inputs are integrated during subsequent training sessions. To this end, after each session we save the class image prototype computed as the class average embedding (denoted as $z^y$, $y \in C^k$, $k < t$). Those can be stored as a separate copy (in a buffer B) and subsequently incorporated into a cross-entropy loss function. By integrating these preserved prompts into the learning cycles of future sessions, the system provides a robust transition between successively learned classes while minimizing the potential for confusion with newly introduced class variations.

For each incremental session, the system recalculates probabilities to reflect current and past class relationships through a novel use of the cross-entropy loss function. This function is adapted to include contributions from both present session classes and accumulated historic data, thereby refining the relational matrix of class prototypes. The loss function for an incremental session can be represented as follows:

$$L_{CE}^t = \mathbb{E}_{(z,y) \sim D^t} [-\log p(y \mid z)]$$

where z represents the image features adapted through the hyperbolic space projection during the current session and y represents the class labels. $L^t_{CE}$ is designed to optimize the current session's learning objectives while ensuring the distinctiveness required for fine-grained class separation.

Simultaneously, the loss function integrating class prototypes from previous sessions, denoted as $L^{k<t}_{CE}$, is employed, ensuring the consistency of class representation across all sessions:

$$L^{k<t}_{CE} = \mathbb{E}_{(z,y)\sim B^{k<t}}[-\log p(y \mid z)]$$

Here, $B^{k<t}$ symbolizes the buffer storing all class prototypes from sessions k=0 . . . t−1, which assists in maintaining the integrity and continuity of class learning across sessions.

The comprehensive objective for each incremental session thus combines the immediate session's cross-entropy loss with the stored historical data's cross-entropy loss, complemented by regularization terms for image and text features. This is succinctly encapsulated in the following:

$$L^t_{CE} + \gamma L^{k<t}_{CE} + \alpha L_{image-reg} + \beta L_{text-reg}$$

With $\gamma$ balancing the trade-off with the former sessions knowledge.

Through this system architecture, the system not only advances new learning within the constraints of Few-Shot Class Incremental Learning but also significantly mitigates the risk of erasing valuable historical class information, thereby robustly supporting both current and retrospective learning demands.

FIG. 6 illustrates a method 600 for training a machine-learning system with few-shot class-incremental learning, according to the principles disclosed herein. The method 600 can be executed by one or more of the systems disclosed herein.

At 602, the CLIP model is provided. Prior to this step, as detailed in previous sections, the preparatory actions include collecting a dataset comprising a plurality of image and text pairs, which are pre-processed to align with the input requirements of the CLIP model. The image data undergo preprocessing to enhance quality and uniformity, whereas the text data is standardized through tokenization and normalization procedures. These steps ensure that the data fed into the CLIP model at step 602 is optimally configured for effective training.

At step 604, adjustments are made to the vision prompt weights within the image encoder based on discrepancies identified between the generated image outputs and the desired image attributes as specified in the input requirements. Concurrently, the text prompt weights within the text encoder are adjusted to align more closely with the semantic accuracy requirements outlined in the preceding text processing steps. These adjustments serve to optimize the cohesiveness and accuracy of multimodal outputs. Further, the modification of both the vision and text prompt weights is executed in a manner that fosters enhanced interaction between the encoded visual and textual data, thus refining the overall system performance.

At step 606, the adjusted CLIP model, previously modified to enhance correlation between images and text specific to the user's domain, is executed on input images and text inputs. This execution facilitates the generation of base session image embeddings and base session text embeddings. The generated embeddings are derived by processing the inputs through the encoder mechanisms of the adjusted CLIP model. These embeddings represent a foundational component for subsequent processing stages aimed at image-text pair matching and retrieval tasks, leveraging the tailored adjustments made to the model.

At step 608, the image and text embeddings previously obtained from steps 604 and 606, respectively, are paired using a base session cross-entropy loss function. This function measures the discrepancy between the actual output of the model and the expected output, facilitating the training of the neural network by adjusting weights to minimize loss. The pairing of these embeddings enhances the model's ability to generate accurate and contextually relevant translations between the image contents and textual descriptions. This pairing process relies on the synergy between visual and textual data.

At block 610, the process iteratively repeats the base training session to reduce the loss metric, thereby refining the model's performance over multiple iterations. This involves adjusting the weights and biases within the neural network based on the gradient of the loss function as computed from the training data. The adjustments are made according to the optimization algorithm described previously, which aims to find the set of parameters that minimizes the loss more effectively across the dataset. The continuous iteration allows for progressive enhancements in the accuracy and reliability of the model's output, aligning with objectives set forth in earlier sections of the description.

Following the completion of the base sessions (e.g., based on convergence), the process transitions to the incremental sessions as depicted in step 612. During this step, the weights associated with the vision prompts are set to a fixed value and are no longer subject to modification throughout the remainder of the process. In contrast, the weights corresponding to the text prompts retain their adjustability, allowing for further refinement based on subsequent inputs and feedback. This differentiation in weight adjustability between the vision and text prompts is designed to stabilize the visual elements of the output while continuing to fine-tune the textual responses based on the evolving data inputs. This reduces computational power requirements.

In step 614, following the freezing of the vision prompt weights in the CLIP model as described in step 612, the CLIP model is executed. This execution facilitates the generation of incremental session image embeddings and incremental session text embeddings. These embeddings are derived from the input data, which includes a set of images and text collected from a predefined session. The frozen state of the vision prompt weights ensures consistency in the embeddings generation process across different sessions, aiding in maintaining uniformity in the output results despite variations in the input data.

At step 616, these embeddings are paired utilizing an incremental session cross-entropy loss function that integrates session-specific prompt weights, tailored to accommodate new classes while preserving previously acquired knowledge. This setup, reflecting earlier portions of the detailed description, ensures that each incremental session adapts dynamically based on the outcomes of previous pairings and loss assessments. As detailed earlier, the embeddings are derived from a multi-layer network designed to handle varying input class distributions. The iterative process, as marked by step 618, involves the repetition of these operations to systematically reduce the loss metrics in subsequent sessions, utilizing feedback loops that adjust the prompt weights and learning rates based on prior performance outcomes. Once convergence is achieved, a trained machine learning model is provided.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for training a machine-learning system with few-shot class-incremental learning, the method comprising:

providing a Contrastive Language-Image Pretraining (CLIP) model having (i) an image encoder configured to generate image embeddings associated with input images, (ii) a text encoder configured to generate text embeddings associated with text input, and (iii) a comparison module configured to compare similarities amongst the image embeddings and the text embeddings;

during a base training session:

(i) adjusting vision prompt weights within the image encoder and text prompt weights within the text encoder, (ii) executing the CLIP model on the input images and the text input with the adjusted vision prompt weights and text prompt weights to generate base session image embeddings and base session text embeddings, (iii) pairing the base session image embeddings and the base session text embeddings using a base session cross-entropy loss function, and (iv) repeating the base training session to minimize the base session cross-entropy loss function;

during incremental sessions after the base training session:

(i) freezing the vision prompt weights while leaving the text prompt weights unfrozen, (ii) executing the CLIP model with the frozen vision prompt weights and the unfrozen text prompt weights to generate incremental session image embeddings and incremental session text embeddings, (iii) pairing the incremental session image embeddings and the incremental session text embeddings using an incremental session cross-entropy loss function with session-specific prompt weights associated with each respective incremental session, and (iv) repeating the incremental sessions to minimize the incremental session cross-entropy loss function utilizing the session-specific prompt weights; and outputting a trained machine-learning system based on the base training session and the incremental sessions.

2. The method of claim 1, further comprising:

during the base training session, projecting the base session image embeddings and the base session text embeddings into a hyperbolic space;

wherein the pairing of the base session image embeddings and the base session text embeddings is based on the hyperbolic space.

3. The method of claim 2, further comprising:

determining a hyperbolic distance between the base session image embeddings and the base session text embeddings;

wherein the pairing of the base session image embeddings and the base session text embeddings is based on the hyperbolic distance.

4. The method of claim 1, wherein:

the image encoder includes transformer layers, the text encoder includes transformer layers, the step of adjusting includes:

intersplicing the vision prompts between the transformer layers of the image encoder, and intersplicing the text prompt weights between the transformer layers of the text encoder.

5. The method of claim 1, wherein the vision prompts comprise vectorized visual data, and the text prompt weights comprise vectorized textual data.

6. The method of claim 1, further comprising:

executing a regularization configured to maintain pre-learned knowledge by imposing constraints on deviations from the vision prompt weights and the text prompt weights.

7. The method of claim 6, wherein the executing of the regularization includes calculating a loss term for discrepancies between adjusted image prompt weights and the frozen image prompt weights.

8. The method of claim 1, wherein the session-specific prompt weights in the incremental sessions are generated based on the text embeddings and are differentiated from the text prompt weights used in previous sessions.

9. The method of claim 8, wherein the session-specific prompt weights are incorporated into the incremental session cross-entropy loss function.

10. The method of claim 9, further comprising saving the session-specific prompt weights as non-differentiable data and reusing the session-specific prompt weights in subsequent incremental sessions as parameters of the incremental session cross-entropy loss function.

11. The method of claim 10, wherein saving the session-specific prompt weights involves storing them in a buffer configured to retain session-specific information across multiple incremental sessions.

12. A system for training a machine-learning models with few-shot class-incremental learning, the system comprising:

a processor; and memory storing instructions that, when executed by the processor, cause the processor to perform the following steps:

providing a Contrastive Language-Image Pretraining (CLIP) model having (i) an image encoder configured to generate image embeddings associated with input images, (ii) a text encoder configured to generate text embeddings associated with text input, and

19

20

(iii) a comparison module configured to compare similarities amongst the image embeddings and the text embeddings;

during a base training session:

(i) adjusting vision prompt weights within the image encoder and text prompt weights within the text encoder, (ii) executing the CLIP model on the input images and the text input with the adjusted vision prompt weights and text prompt weights to generate base session image embeddings and base session text embeddings, (iii) pairing the base session image embeddings and the base session text embeddings using a base session cross-entropy loss function, and (iv) repeating the base training session to minimize the base session cross-entropy loss function;

during incremental sessions after the base training session:

(i) freezing the vision prompt weights while leaving the text prompt weights unfrozen, (ii) executing the CLIP model with the frozen vision prompt weights and the unfrozen text prompt weights to generate incremental session image embeddings and incremental session text embeddings, (iii) pairing the incremental session image embeddings and the incremental session text embeddings using an incremental session cross-entropy loss function with session-specific prompt weights associated with each respective incremental session, and (iv) repeating the incremental sessions to minimize the incremental session cross-entropy loss function utilizing the session-specific prompt weights; and outputting a trained machine-learning system based on the base training session and the incremental sessions.

13. The system of claim 12, wherein the instructions, when executed by the processor, further cause the processor to perform the following step:

during the base training session, projecting the base session image embeddings and the base session text embeddings into a hyperbolic space;

wherein the pairing of the base session image embeddings and the base session text embeddings is based on the hyperbolic space.

14. The system of claim 13, wherein the instructions, when executed by the processor, further cause the processor to perform the following step:

determining a hyperbolic distance between the base session image embeddings and the base session text embeddings;

wherein the pairing of the base session image embeddings and the base session text embeddings is based on the hyperbolic distance.

15. The system of claim 12, wherein:

the image encoder includes transformer layers, the text encoder includes transformer layers, the step of adjusting includes:

intersplicing the vision prompts between the transformer layers of the image encoder, and intersplicing the text prompt weights between the transformer layers of the text encoder.

16. The system of claim 12, wherein the vision prompts comprise vectorized visual data, and the text prompt weights comprise vectorized textual data.

17. The system of claim 12, wherein the instructions, when executed by the processor, further cause the processor to perform the following step:

executing a regularization configured to maintain pre-learned knowledge by imposing constraints on deviations from the vision prompt weights and the text prompt weights.

18. The system of claim 17, wherein the executing of the regularization includes calculating a loss term for discrepancies between adjusted image prompt weights and the frozen image prompt weights.

19. The system of claim 12, wherein the session-specific prompt weights in the incremental sessions are generated based on the text embeddings and are differentiated from the text prompt weights used in previous sessions.

20. A non-transitory computer-readable medium having instructions stored thereon, which when executed by a processor, causes a machine-learning system to perform a method for training with few-shot class-incremental learning, the method comprising:

providing a Contrastive Language-Image Pretraining (CLIP) model having (i) an image encoder configured to generate image embeddings associated with input images, (ii) a text encoder configured to generate text embeddings associated with text input, and (iii) a comparison module configured to compare similarities amongst the image embeddings and the text embeddings;

during a base training session:

(i) adjusting vision prompt weights within the image encoder and text prompt weights within the text encoder, (ii) executing the CLIP model on the input images and the text input with the adjusted vision prompt weights and text prompt weights to generate base session image embeddings and base session text embeddings, (iii) pairing the base session image embeddings and the base session text embeddings using a base session cross-entropy loss function, and (iv) repeating the base training session to minimize the base session cross-entropy loss function;

during incremental sessions after the base training session:

(i) freezing the vision prompt weights while leaving the text prompt weights unfrozen, (ii) executing the CLIP model with the frozen vision prompt weights and the unfrozen text prompt weights to generate incremental session image embeddings and incremental session text embeddings, (iii) pairing the incremental session image embeddings and the incremental session text embeddings using an incremental session cross-entropy loss function with session-specific prompt weights associated with each respective incremental session, and (iv) repeating the incremental sessions to minimize the incremental session cross-entropy loss function utilizing the session-specific prompt weights; and outputting a trained machine-learning system based on the base training session and the incremental sessions.

* * * * *